3,519,642
CELLULOSE-CONTAINING TEXTILES COLORED WITH REACTIVE DYESTUFFS

Karlfried Wedemeyer, Cologne-Stammheim, Detlef Delfs, Opladen, and Winfried Kruckenberg, Leverkusen, Germany, assignors to Farbenfabriken Bayer Aktiengesellschaft, Leverkusen, Germany, a corporation of Germany
No Drawing. Continuation of application Ser. No. 402,348, Oct. 7, 1964, which is a continuation-in-part of application Ser. No. 785,327, Jan. 7, 1959. This application July 30, 1968, Ser. No. 755,491
Claims priority, application Germany, Jan. 28, 1958, F 24,914; Sept. 26, 1968, F 26,669
Int. Cl. C09b 47/04
U.S. Cl. 260—314.5        5 Claims

ABSTRACT OF THE DISCLOSURE

This disclosure is concerned with derivatives of azo, azomethine, anthraquinone, triphenylmethane, oxazine and azoporphine dyestuffs.

---

The present application is a continuation of Ser. No. 402,348, filed Oct. 7, 1964, now abandoned, which application, in turn, is a continuation-in-part of our application Ser. No. 785,327 filed Jan. 7, 1959, now abandoned and relates to the dyeing and printing of cellulose and cotton containing textile materials treated with dyestuffs of the following composition and to the alkali salts of said dyestuffs $$F-[R-R_1-R_2-Y]_n$$

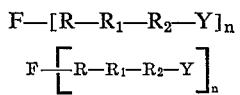

wherein F stands for a residue or moiety of an organic dyestuff, R represents a member selected from the group consisting of lower alkylene and cycloalkylene, $R_1$ stands for a member selected from the class consisting of —S— and

in which X is hydrogen, lower alkyl, —$R_2$—Y and —$CH_2$—$CH_2$—N—$CH_2$—$CH_2$— forming with N of the

group a piperazine ring, $R_2$ stands for a lower alkylene group and Y is a member selected from the group consisting of chlorine, —$OSO_3H$ and —$OSO_3Z$, Z being an alkali metal cation, and $n$ stands for an integer falling within the range of 1 to 8.

Many of the dyestuffs useful in this invention are those wherein an aromatic ring of F is separated from R by a member selected from the group consisting of —CO—, —$SO_2$—, —NH—,

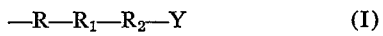

In other dyestuffs, R is directly attached to an aromatic ring of F.

The dyestuffs employed in treating cellulose textiles are obtainable by introducing into dyestuffs according to known methods at least once the following grouping:

$$-R-R_1-R_2-Y \qquad (I)$$

in this formula R, $R_1$, $R_2$ and Y have the above mentioned meaning.

The process may be based on widely varied classes of compounds, for example azo, azomethine, anthraquinone, triphenylmethane, oxazine and azoporphine dyestuffs. The introduction of at least one substituent of the formula

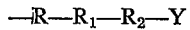

into these dyestuffs is carried out by known methods, for example by reacting dyestuff-sulfonic acid chlorides or -carboxylic acid chlorides with components, for example with the sulfuric acid ester of N-β-hydroxyethyl-N-methylpropylenediamine-(1,3), already containing the grouping (I), or by combining a sulfonic acid chloride or carboxylic acid chloride group-containing dyestuff with components, such as N-β-hydroxyethyl-N-methylpropylenediamine-(1,3), from which the grouping (I) is obtainable by subsequent esterification of the hydroxyl group with, for example, sulfuric acid. If in the grouping (I) Y means a halogen atom, dyestuff-sulfonic acid chlorides or -carboxylic acid chlorides may be reacted with the ω-halogen compounds corresponding to the group (I), for example N-β-chloroethyl-N-methylpropylenediamine-(1,3).

Dyestuffs of particular interest, obtainable according to the aforementioned processes are, e.g., those having the formula

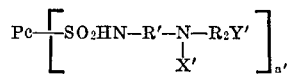

wherein Pc stands for a phthalocyanine residue, R' is a lower alkylene group, X' stands for a member selected from the group consisting of hydrogen, lower alkyl and $R_2$—Y', $R_2$ is a lower alkylene having at least two carbon atoms, Y' means a member selected from the group consisting of —$OSO_3H$ and —$OSO_3Z$, Z being an alkali metal cation, and $n'$ stands for an integer falling within the range of 1 to 4.

The reactions for preparing the new dyestuffs may, of course, be widely varied. Thus, the introduction of the grouping (I) into the dyestuffs may also take place in several steps, for example by reacting the chloromethyl compound of a dyestuff with β-hydroxyl-methylamine and subsequently esterifying the hydroxyl group in the end position with sulfuric acid.

If the production of the new dyestuffs is started from preliminary dyestuff products and the grouping

is already introduced into the latter, for example, by one of the processes described above, the preliminary products thus substituted may be converted into the corresponding dyestuffs according to known methods, for example in the production of azo dyestuffs diazotization and/or coupling. Dyestuffs of this type are obtainable, for example, by coupling twice the molar amount of the diazotized sulfuric acid ester of 3-aminobenzyl-β-hydroxyethyl-methylamine with 1,8-dihydroxynaphthalene-3,6-disulfonic acid.

The process may also be carried out by pre-forming the said grouping in the preliminary dyestuff products and finally forming the grouping (I) after conversion of the preliminary dyestuff products only. Thus, by coupling diazotized 4-aminobenzyl-β-hydroxyethyl-methylamine with 1-phenyl-3-methylpyrazolone-(5), a monoazo dyestuff is, for example, obtainable which does not yet contain the radical Y in the grouping (I). This radical can then be introduced by esterification of the aliphatic hydroxy group by one of the aforesaid processes, for example, with the reaction product from chlorosulphonic acid and pyridine.

The aforesaid processes permit numerous possibilities of linking the grouping

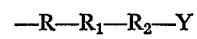

with the aromatic or heterocyclic ring systems of the dyestuff. Some of these possibilities are shown as follows:

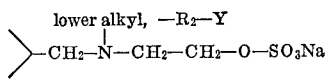

such as

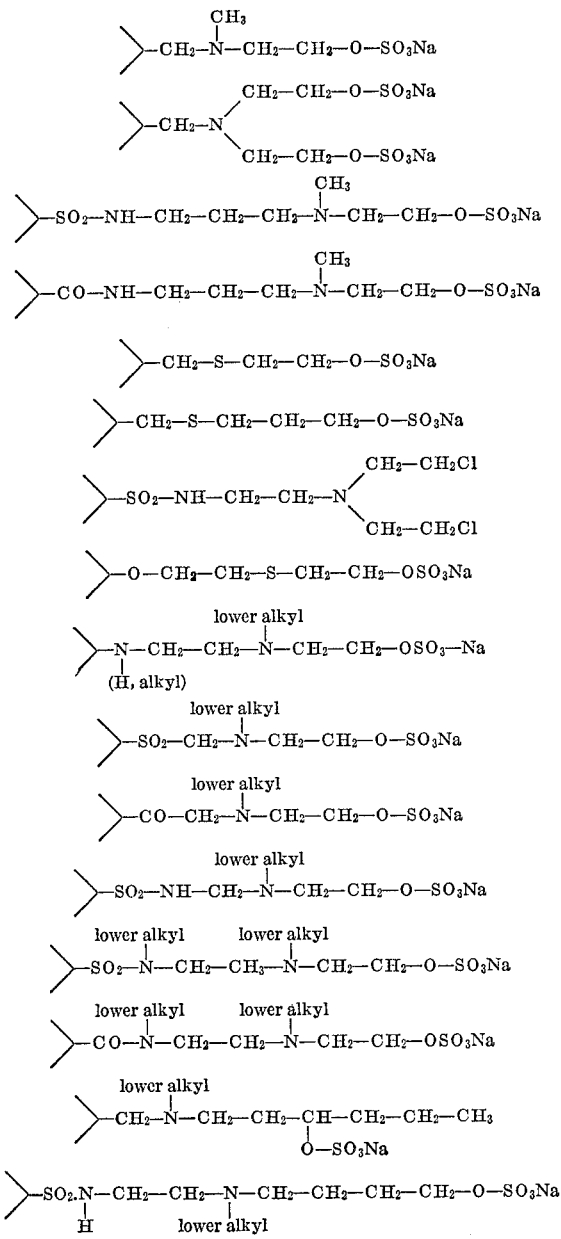

Radicals in which the substituent X of the group

in $R_1$ in the general Formula I represents

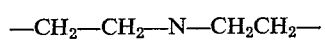

may be built up for example as follows:

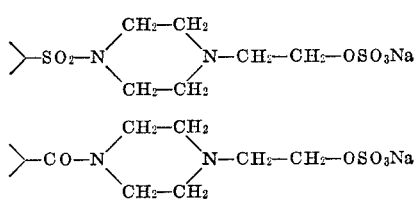

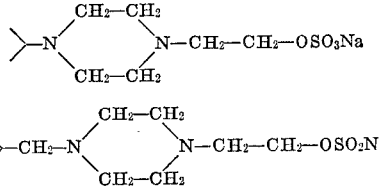

The alkylene radical $R_2$ may be a straight or branched chain radical.

As alkali metal salts of the dyestuffs containing as radical $Y-OSO_3H$ groups there may be considered sodium, potassium and lithium salts.

In addition to the groupings to be introduced into the dyestuffs or preliminary dyestuff products, the new dyestuffs may also contain other usual substituents, preferably also solubilizing groups such as sulfonic acid and carboxylic acid groups.

The new dyestuffs are suitable for the dyeing and printing of cellulose-containing textile materials, particularly for the dyeing and printing of fibres and fabrics of native and regenerated cellulose. Dyeings or prints of excellent fastness to washing and boiling are obtainable on these materials by applying the dyestuffs onto the dyeing material and subjecting the dyeing material to the action of acid-binding agents, preferably at an elevated temperature.

For dyeing, the dyestuffs are preferably used in an aqueous solution which may be treated with alkaline substances such as alkali metal hydroxide or alkali metal carbonate or with compounds convertible into alkaline substances such as alkali metal bicarbonate. To the solution there may be added further auxiliaries which should, however, not react with the dyestuffs in an undesirable manner. Additives of this type are for example surface-active substances such as alkyl sulphates or substances preventing the migration of the dyestuff, or dyeing auxiliaries such as urea (for improving the solubility and fixing of the dyestuffs), or inert thickeners such as oil-in-water emulsions, tragacanth, starch, alginate or methylcellulose.

The solutions or pastes thus produced are applied to the material, for example by padding on the foulard and then heated to an elevated temperature of, preferably, 40–150° C. for some time. The heating can be effected in the hot flue, in a steaming apparatus, on heated rollers or by introducing the material into hot concentrated salt baths, either separately or consecutively in any sequence.

When using a padding or dye liquor without alkali, the dry material is subsequently passed through an alkaline solution with the addition of sodium chloride or Glauber's salt. The addition of salt reduces the migration of the dyestuff from the fibre.

The dyeing material may also be pre-treated with one of the aforesaid acid-binding agents, subsequently treated with the dyestuff solution and, finally, fixed at an elevated temperature as indicated above.

After fixation, the dyeing material is rinsed hot and, if required by the intended use of the dyed material, subsequently soaped in order to remove the insufficiently fixed residual dyestuff. Dyeings of excellent fastness to wetting are thus obtained, although the dyestuffs preferably used do not possess any or only a slight affinity to the dyeing material.

For printing cellulose-containing textile materials, a printing paste is used which consists of the dyestuff solution, a thickener such as sodium alginate, and an alkaline compound or a compound splitting off alkali upon heating such as sodium carbonate, potassium carbonate or sodium bicarbonate, and the printed material is rinsed and, finally soaped, if desired.

Amide group-containing materials such as wool, silk and the like may be dyed in a similar manner in a more weakly alkaline to neutral medium. The dyeing process is expediently followed by a washing in a neutral or alkaline aqueous bath.

Particularly suitable dyestuffs for the new dyeing and printing process are those which do not possess any or only a slight affinity to the dyeing materials. The use of these dyestuffs enables the dyestuff molecules not firmly fixed to the fibre to be completely removed by a final washing in a neutral or alkaline aqueous bath.

The following examples are given for the purpose of illustrating the invention without, however, limiting it thereto.

EXAMPLE 1

12.4 g. of the sulphuric acid ester of 3-aminobenzyl-β-hydroxyethyl-methylamine are dissolved in 50 ml. of sodium hydroxide solution, 31 ml. of a 10% sodium nitrite solution are added, and the solution is stirred at 0–3° C. into 80 ml. of 2 N hydrochloric acid. The diazonium salt solution is stirred into a solution of 7.7 g. of 1-phenyl-3-methyl pyrazolone-(5) in 45 ml. of a 1 N sodium hydroxide solution and 50 ml. of water, and a pH value of 9–10 is maintained by the simultaneous addition of sodium carbonate. After completion of the coupling, the dyestuff is salted out as sodium salt, filtered off with suction and dried.

2 g. of the the dyestuff thus obtained are dissolved in 100 ml. of water with the addition of 3.2 g. of sodium hydroxide, 0.3 g. of Turkey red oil and 10 g. of urea. The solution is padded onto cotton and the impregnated fabric is heated to 110° C. for 10 minutes. The material is then rinsed and boiled with soap. A yellow dyeing is thus obtained which is very fast to wetting.

EXAMPLE 2

10.5 g. of 3-aminobenzyl-di-β-hydroxyethylamine are dissolved in 150 ml. of 2 N hydrochloric acid and diazotized at 0–5° C. with 35 ml. of a 10% nitrite solution. The diazonium salt solution thus obtained is stirred into a solution of 8.7 g. of 1-phenyl-3-methyl-pyrazolone-(5) in 50 ml. of a 1 N sodium hydroxide solution and 50 ml. of water, and 20 g. of sodium carbonate are slowly added at the same time. After completion of the coupling, the dyestuff is filtered off with suction and dried 70° C. 8.2 g. of the dyestuff thus obtained are dissolved in 60 ml. of pyridine and 5.4 g. of chlorosulphonic acid are added dropwise to this soluiton at 0–3° C. The reaction solution is then stirred into a mixture of 100 g. of ice-water and 65 ml. of a 2 N sodium carbonate solution the pyridine is distilled off at 40° C. under vacuum, the residue taken up with water and the dyestuff is salted out from this solution, filtered off with suction and dried.

2 g. of this dyestuff are dissolved in 100 ml. of water with the addition of 3.2 g. of sodium hydroxide, 0.5 g. of Turkey-red oil and 10 g. of urea. This solution is padded onto cotton and the impregnated fabric is heated to 140° C. for 10 minutes. The fabric is then rinsed and boiled with soap. A yellow dyeing of very good fastness to wetting is thus obtained.

EXAMPLE 3

12.4 g. of the sulphuric acid ester of 3-aminobenzyl-β-hydroxyethyl-methylamine are dissolved in 50 ml. of a 1 N sodium hydroxide solution, 31 ml. of a 10% sodium nitrite solution are added and the solution is stirred at 0–3° C. into 80 ml. of 2 N hydrochloric acid. An almost colourless diazonium salt solution is thus obtained which is stirred at 0–3° C. into a suspension of 15.8 g. of the reaction product from nickel-phthalocyanine-(3)-tetrasulphochloride with four times the molar amount of 1-(3'-aminophenyl) - 3 - methyl-pyrazolone-(5) in 500 ml. of water and 20 g. of sodium carbonate. After completion of the coupling, the dyestuff is salted out, filtered off with suction and dried at 50° C. under vacuum.

2 g. of the isolated dyestuff are dissolved in 100 ml. of water with the addition of 3.2 g. of sodium hydroxide, 0.2 g. of Turkey-red oil and 10 g. of urea. The solution is padded onto cotton and the impregnated fabric is heated to 140° C. for 10 minutes. The fabric is then rinsed and boiled with soap. A green dyeing is thus obtained of very good fastness to wetting and good fastness to light.

EXAMPLE 4

18.2 g. of the sulphuric acid ester of 3-aminobenzyl-β-hydroxyethyl-methylamine are dissolved in 75 ml. of a 1 N sodium hydroxide solution, 46.5 ml. of a 10% sodium nitrite solution are added and the solution is stirred at 0–3° C. into 120 ml. of 2 N hydrochloric acid. The diazonium salt solution thus obtained is stirred into a solution of 18 g. of the sodium salt of 1,8-dihydroxy-naphthalene-3,6-disulphonic acid in 100 ml. of water and a pH value of 9–10 is maintained by the addition of sodium carbonate. After completion of the coupling, the dyestuff is salted out, filtered off with suction and dried.

2 g. of this dyestuff are dissolved in 100 ml. of water and treated with 3 g. of sodium hydroxide and 5 g. of urea. The solution is padded onto calico and the impregnated fabric is heated to 140° C. for 10 minutes. The fabric is then rinsed and boiled with soap. A navy blue dyeing of very good fastness to wetting is thus obtained.

EXAMPLE 5

5.5 g. of ω-(β-hydroxyethyl-methylamino)-4-amino-acetophenone are diazotized in 80 ml. of 2 N hydrochloric acid at 0–5° C. by the addition of 18.5 ml. of a 10% sodium nitrite solution and coupled with 4.6 g. of 1-phenyl-3-methyl-pyrazolone-(5) dissolved in 27 ml. of a sodium hydroxide solution and 50 ml. of water. A pH value of 10 is maintained by the addition of 10 g. of sodium carbonate. The dyestuff is filtered off with suction and dried at 70° C. 9.5 g. of the dyestuff are dissolved in 120 ml. of pyridine and 2.9 g. of chlorosulphonic acid are added dropwise at 0.3° C. The mixture is stirred into ice-water, neutralised with sodium carbonate, the pyridine is distilled off under vacuum at 40° C., the residue taken up with water, the dyestuff salted out, filtered off with suction and dried.

2 g. of the dyestuff are dissolved in 100 ml. of water with the addition of 4 g. of sodium hydroxide, 0.2 g. of Turkey-red oil and 10 g. of urea. The solution is padded onto calico and the impregnated fabric is heated to 100° C. for 10 minutes. After rinsing and boiling with soap, a yellow dyeing is obtained which is very fast to wetting.

EXAMPLE 6

18.3 g. of 4-aminobenzyl-β-hydroxyethyl-thioether are dissolved in 300 ml. of 2 N hydrochloric acid and diazotized at 0–5° C. by the addition of 69 ml. of a 10% sodium nitrite solution. The diazonium salt solution is stirred into a solution of 17.4 g. of 1-phenyl-3-methyl-pyrazolone-(5) in 100 ml. of a 1 N sodium hydroxide solution and 100 ml. of water while maintaining a pH 9–10 by the addition of 40 g. of sodium carbonate. After completion of the coupling, the dyestuff is salted out, filtered off with suction and dried at 70° C. 18.4 g. of the dyestuff are dissolved in 300 ml. of pyridine and esterfied at 0–3° C. with 6 g. of chlorosulphonic acid. The mixture is then stirred into ice-water, the solution neutralised with potassium carbonate and the pyridine distilled off at 40° C. under vacuum. The residue is taken up with water, the dyestuff salted out as potassium salt, filtered off with suction and dried.

2 g. of the dyestuff thus obtained are dissolved in 100 ml. of water with the addition of 4 g. of sodium hydroxide and 10 g. of urea. The solution is padded onto calico and the impregnated fabric is heated to 140° C. for 10 minutes. The fabric is then rinsed and boiled with soap. A yellow dyeing is thus obtained which is very fast to wetting.

EXAMPLE 7

A solution of 2 g. of the dyestuff obtainable according to Example 4 in 33 ml. of water and 5 g. of a sodium hydroxide solution (38° Bé.) is stirred, after the addition of 10 g. of urea, into 50 g. of an alginate thickening containing 30 g. of dry substance per kilogram. Calico printed with this paste is dried at 80° C. and the print is developed by subsequent steaming at 105° C. within 10 minutes. After rinsing and boiling with soap, a navy blue print of very good fastness to wetting is obtained.

EXAMPLE 8

By printing calico with a printing paste obtainable by stirring a solution of 2 g. of the dyestuff prepared according to Example 3 and 10 g. of urea in 25 g. of water and 5 g. of a sodium hydroxide solution 38° Bé. into 58 g. of an alginate thickening, drying the print at 80° C. and fixing at 140° C. on a calender roll within 10 minutes, and after boiling with soap, a green print of very good fastness to wetting and good fastness to light is obtained.

EXAMPLE 9

82.5 g. of Cu-phthalocyanine-trisulphochloride are added to a solution of 35 g. of N,N-dimethyl-propylenediamine in ice-water, rendered alkaline, after completion of the reaction, with a sodium hydroxide solution, filtered off with suction, washed and dried. The dyestuff thus obtained is slowly added at 140–150° C. to about 1000 g. of tri-(β-chlorethyl)-amine, after-stirred for about 5–10 minutes, the precipitated dyestuff, after cooling, is filtered off with suction, washed with some petroleum ether and dried.

2 g. of the dyestuff are dissolved in 100 ml. of water. This solution is padded onto cotton, dried, impregnated with a solution of 4 g. of a sodium hydroxide solution, 0.2 g. of Turkey-red oil and 10 g. of urea in 100 ml. of water, and heated to 40° C. for 10 minutes. After rinsing, a turquoise blue dyeing is obtained which is very fast to wetting and light and, even in the crease resistance process, does not show a fading of shade or a diminishing of the resistance to light. An equally good fixation is obtainable by using sodium carbonate instead of a sodium hydroxide solution likewise at 40° C.

The dyestuffs listed in the following table are obtainable in an analogous manner to the instructions of this example by reacting the dyestuff sulphochlorides with N,N-dimethyl-propylenediamine and subsequent quaternizing in tri-(β-chlorethyl)-amine. After fixation on cotton according to the above instructions, they yield dyeings and prints of very good fastness to wetting in the shades listed below.

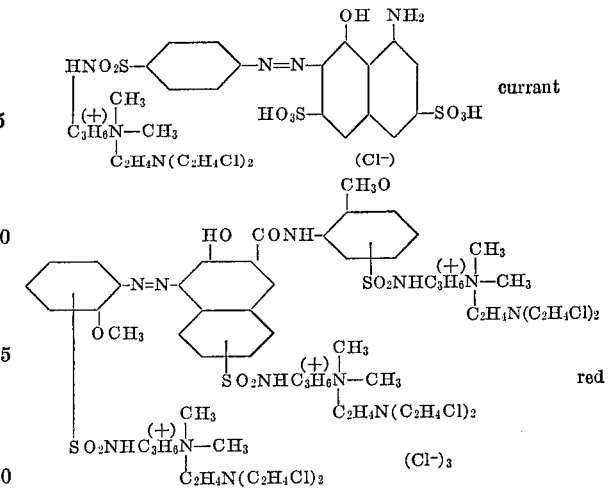

currant red

EXAMPLE 10

The trisulphochloride of Cu-phthalocyanine is reacted with 40 g. of N,N-dihydroxy-ethyl-propylenediamine as described in Example 9, the dyestuff thus obtained is heated with 1000 g. of butane sultone to 100–120° C. for about 10–15 minutes, about 2000 g. of toluene are added after cooling, the dyestuff is filtered off with suction, heated in thionyl chloride for about 30 minutes, filtered off with suction and dried.

2 g. of the dyestuff thus obtained are dissolved in 100 ml. of water with the addition of 4 g. of a sodium hydroxide solution or sodium carbonate, 0.5 g. of Turkey-red oil and 10 g. of urea. The solution is padded onto cotton and the impregnated fabric is heated to 40° C. for 10 minutes, then rinsed and boiled with soap. A turquoise blue dyeing of very good fastness to wetting is thus obtained.

EXAMPLE 11

By using the monsulphochloride of Cu-phthalocyanine and di-(β-dihydroxyethyl-aminoethyl)-amine in a similar manner to that described in Example 10, a dyestuff is obtained which by the same dyeing method yields a greenish blue dyeing of very good fastnes to washing.

EXAMPLE 12

145 g. of copper phthalocyanine-(3)-tetrasulphochloride are introduced with ice-cooling into a mixture of 150 g. of ethanolamine and 290 ml. of water and stirred overnight at room temperature. The mixture is heated to 50–55° C. for another 2 hours and the condensation product is filtered off with suction. After washing with 2 litres of hot water, the product is dried under vacuum at 50° C.

The well dried substance is boiled under reflux with 500 ml. of thionyl chloride for 5 hours and, after cooling, placed on ice. The readily filterable reaction product

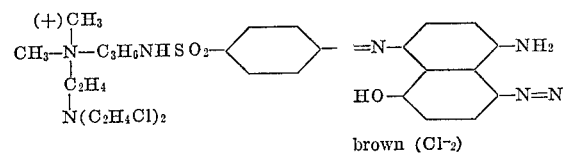

brown (Cl⁻₂)

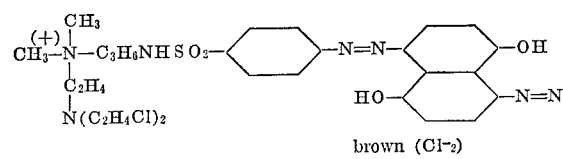

brown (Cl⁻₂)

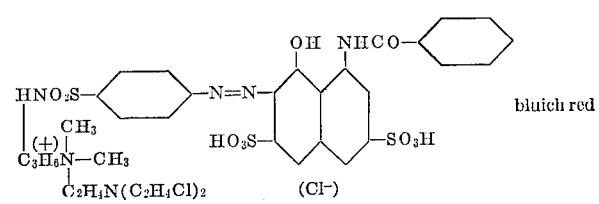

bluish red thus obtained is filtered off with suction and washed neutral with water.

The suction-filtered cake is introduced into 1200 g. of N-methyl-N-4-hydroxybutylamine-(1) and stirred at 110–120° C. for 5 hours. The solution thus obtained is then stirred into 3 litres of water, the product is salted out by the addition of a saturated potassium chloride solution and filtered off with suction. The filter cake is washed with 3 litres of water and then dried at 50° C. under vacuum.

For conversion into the sulphuric acid ester, the well dried product is dissolved with ice-cooling in 600 ml. of sulphuric acid (100%) and allowed to stand at room temperature for 3 hours. The solution is then poured onto ice, diluted to a volume of 10 litres and the dyestuff is salted out with potassium chloride. After filtering off with suction, the dyestuff is suspended in water and adjusted to pH 7 by the addition of a 10% sodium hydroxide solution. The dyestuff is then again filtered off with suction and dried at 50° C. under vacuum.

2 g. of the dyestuff thus obtained are dissolved in 100 ml. of water with the addition of 3.2 g. of sodium hydroxide, 0.3 g. of Turkey-red oil and 10 g. of urea. The solution is padded on cotton and the impregnated fabric is heated to 110° C. for 10 minutes. The fabric is then rinsed and boiled with soap. A blue dyeing of very good fastness to wetting is thus obtained.

EXAMPLE 13

(a) 0.15 mol of copper-phthalocyanine-(3)-tetrasulphochloride are introduced with ice-cooling and good stirring into a solution of 150 g. of ethanolamine in 1350 ml. of water. The external cooling is removed, the mixture is after-stirred at room temperature for several hours and then heated to 50–55° C. for 2 hours in order to complete the reaction. The hot reaction product insoluble in salt-containing water is then filtered off with suction, washed with water, in order to remove the excess amine, and the blue copper-phthalocyanine-(3)-tetrasulphonic acid-hydroxyethylamide thus obtained is dried at 65–70° C. under vacuum.

(b) 127 g. of copper-phthalocyanine-(3)-tetrasulphonic acid hydroxyethylamide are heated under reflux in 500 ml. of thionyl chloride for 5 hours. After cooling, the reaction mixture is poured onto ice, the completely insoluble precipitate is filtered off with suction, washed acid-free with water and the copper-phthalocyanine-(3)-tetrasulphonic acid chlorethylamide thus obtained is dried under vacuum.

(c) The process may also be carried out by distilling off the excess thionyl chloride and adding the residue to ice-water, filtering off with suction and washing with methanol.

(d) 0.025 mol of copper-phthalocycanine-(3)-tetrasulphonic acid chlorethylamide are heated in 100 g. of ethanolamine to 110–120° C. for 5 hours. The reaction solution is then poured into 500 ml. of water, some potassium chloride is added and the copper-phthalocyanine-(3)-$(SO_2NHC_2H_4NHC_2H_4OH)_4$ thus obtained is filtered off with suction.

(e) 15 g. of copper-phthalocyanine-(3)-$(SO_2NHC_2H_4NHC_2H_4OH)_4$ are introduced at room temperature into a solution of 15 g. of chlorosulphonic acid in 70 ml. of pyridine. The reaction mixture is stirred for two hours and then run into 220 ml. of a 10% aueous sodium carbonate solution. After distilling off the pyridine under vacuum at 30–40° C., the dyestuff, i.e. copper phthalocyanine-(3)-$(SO_2NHC_2H_4NHC_2H_4OSO_3Na)_4$ is salted out.

(f) 0.2 g. of this dyestuff are dissolved in 10 ml. of a solution containing 25 ml. of concentrated sodium hydroxide solution, 100 g. of urea and 5 g. of Turkey-red oil in 1000 ml. of water and applied to cotton or regenerated cellulose. After squeezing, the material is dried at 100–140° C. for a few minutes and then boiled with soap. A blue dyeing of very good fastness to wetting and good general fastness properties is thus obtained.

EXAMPLE 14

25 g. of the copper-phthalocyanine-(3)-tetrasulphonic acid chlorethylamide obtainable according to Example 13(b) are heated in 150 g. of N-methyl-N-ethanolamine to 120° C. for 6 hours. The reaction solution is then poured into water, the dyestuff salted out and washed with ethanol.

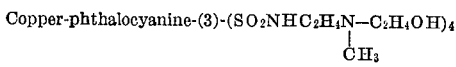

is thus obtained.

30 g. of

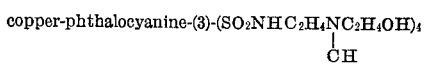

are dissolved in pyridine and added dropwise at room temperature to 9 ml. of chlorosulphonic acid in 150 ml. of pyridine. A slight self-heating takes place. The mixture is after-stirred for 30 minutes, whereupon the oily dyestuff ester precipitates. After decanting off the pyridine, the residue is added to 220 ml. of a 10% sodium carbonate solution and the blue dyestuff is salted out with

| Starting dyestuff | First amine | Second amine | Shade of sulphuric acid semi-ester on cotton |
|---|---|---|---|
| Copper-phthalocyanine-3-$(SO_2Cl)_4$ | $HN(C_2H_4OH)_2$ | $HN{-}C_2H_4OH$<br>$\quad\vert$<br>$\quad CH_3$ | Blue. |
| Do | $H_2NC_2H_4OH$ | $HN(C_2H_4OH)_2$ | Do. |
| Do | $H_2NC_2H_4OH$ | $H_2NC_3H_6OH$ | Do. |
| Do | $H_2NC_3H_6OH$ | $HN{-}C_2H_4OH$<br>$\quad\vert$<br>$\quad CH_3$ | Do. |
| Do | $H_2NC_4H_8OH$ | $HN{-}C_2H_4OH$<br>$\quad\vert$<br>$\quad CH_3$ | Do. |
| Do | $HN{-}C_2H_4OH$<br>$\quad\vert$<br>$\quad CH_3$ | $H_2NC_2H_4OH$ | Do. |
| Do | $HN{-}C_2H_4OH$<br>$\quad\vert$<br>$\quad CH_3$ | $HN{-}C_2H_4OH$<br>$\quad\vert$<br>$\quad CH_3$ | Do. |
| Do | $HN{-}C_2H_4OH$<br>$\quad\vert$<br>$\quad CH_3$ | $HN(C_2H_4OH)_2$ | Do. | potassium chloride. For purification, it is re-dissolved in water and precipitated with methanol. 33 g. of

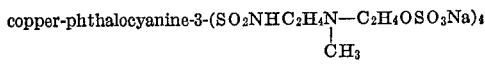

are thus obtained. The dyestuff can be dyed on cotton or viscose according to the process described in Example 13 in the presence of acid-binding agents. The turquoise blue dyeing is distinguished by a very good fastness to wetting and solvents.

According to the methods indicated in Examples 13 and 14, the components of the following table may be reacted to give dyestuffs which according to the instructions of the preceding examples yield on cotton and regenerated cellulose dyeings and prints in the shades listed below and having very good fastness to wetting.

EXAMPLE 15

0.05 mol of copper-phthalocyanine-(4)-tetrasulphochloride are introduced with cooling into a soda alkaline solution of 0.4 mol of

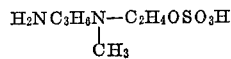

in 1000 ml. of water. The pH value is maintained between 9 and 10 by the addition of a dilute sodium hydroxide solution. The condensation is completed after about 30 minutes. The product is after-stirred at room temperature for an hour and the precipitate obtained in quantitative yield is filtered off with suction. For purification, the dyestuff ester is suspended in water, dissolved by the careful addition of sodium hydroxide solution and re-precipitated by neutralising with dilute hydrochloric acid. 2 g. of

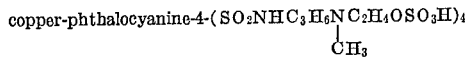

are dissolved in 100 ml. of the solution described in Example 13(f) and padded on cotton or regenerated cellulose. After an intermediate drying at 50–60° C., the material is treated with dry steam at 102–110° C. for a few minutes, a reddish blue dyeing of good fastness to wetting, rubbing and light being thus obtained.

Instead of sodium hydroxide solution, there may also be used other acid-binding agents such as sodium carbonate, potassium carbonate, sodium bicarbonate, potassium bicarbonate, primary or secondary sodium or potassium phosphate, sodium acetate, pyridine, triethylamine and the like.

EXAMPLE 16

28 g. of copper-phthalocyanine-(3)-tetrasulphochloride are introduced into a neutralised solution of 33 g. of NH$_2$C$_2$H$_4$NHC$_2$H$_4$OSO$_3$H in 300 ml. of water. The pH value is maintained constant by the addition of a 10% sodium carbonate solution. The external cooling is removed after 30 minutes and the mixture is after-stirred at 25–30° C. for 2 hours. The product is filtered off with suction whereupon a blue dyestuff is obtained which can be fixed on vegetable fibres in the manner described in Examples 13(f) and 15.

According to the instruction given in Example 15, valuable dyestuffs can likewise be obtained from the following components, which yield on hydroxyl-group-containing materials fixed dyeings in the indicated shades.

| Starting dyestuff | Aminoalkyl sulphuric acid ester | Shade on cotton |
| --- | --- | --- |
| Copper-phthalocyanine-(3)-(SO$_2$Cl)$_4$ | H$_2$NC$_2$H$_4$N(CH$_3$)—C$_2$H$_4$OSO$_3$H | Turquoise blue. |
| Do | H$_2$NC$_3$H$_6$N—(C$_2$H$_4$OSO$_3$H)$_2$ | Blue. |

EXAMPLE 17

84 g. of copper-phthalocyanine-(3)-tetrasulphochloride are introduced with ice-cooling into a solution of 150 g. of N-hydroxyethylethylenediamine in 600 ml. of water. After completion of the addition, the external cooling is removed and the reaction solution is stirred at room temperature overnight. The mixture is then heated to 60° C. for an hour, the condensation product salted out with potassium chloride and filtered off with suction.

35 g. of the dyestuff thus prepared are dissolved in pyridine and added to room temperature to a solution of 20 ml. of chlorosulphonic acid in 80 ml. of pyridine. Self-heating to 30° C. occurs thereby. The mixture is after-stirred for an hour, the pyridine is decanted and the residue dissolved in water. The product is then neutralised with sodium bicarbonate and the dyestuff ester filtered off with suction.

EXAMPLE 18

Into a solution of 40 g. of trihydroxyethyl-diethylenetriamine in 330 ml. of water there are added with good stirring 25 g. of copper-phthalocyanine-(3)-trisulphochloride. The mixture is after-stirred overnight, then heated to the boil for 30 minutes and the hot condensation product is filtered off with suction. For removal of excess amine, the product is washed with water and dried under vacuum.

23 g. of the dyestuff are introduced at 15–20° C. into 69 ml. of sulphuric acid monohydrate. After stirring for 3 hours the reaction solution is poured onto ice and the precipitated dyestuff ester is filtered off with suction. For removal of the mineral acid, the product is washed with salt water and the residue suspended in water. The product is then neutralized with a dilute sodium hydroxide solution and again filtered off with suction.

EXAMPLE 19

The dyestuffs obtainable according to Examples 17 and 18 as well as those of the following table prepared according to the same instruction may likewise be dyed on cotton or regenerated cellulose in the presence of an acid-binding fixing agent.

| Starting material | Aminoalcohol | Shade of dyeing |
| --- | --- | --- |
| Copper-phthalocyanine-(3)-(SO$_2$Cl)$_4$ | Dihydroxy ethylenediamine | Blue. |
| Do | Trihydroxydiethylenetriamine | Turquoise Blue. |

EXAMPLE 20

Into a solution of 123 g. of N-methyl-N-hydroxyethyl-propylenediamine-(1,3) (B.P. 82° C./1 mm. Hg) in 750 ml. of water, 112 g. of copper-phthalocyanine-(3)-tetrasulphochloride are introduced with ice-cooling. The mixture is stirred at room temperature overnight, the condensation product filtered off with suction and washed with water. The dyestuff thus obtained, i.e.

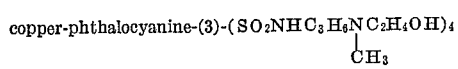

is insoluble in methanol.

100 g. of

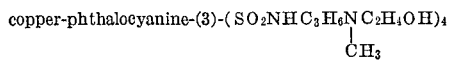

(0.08 mol) are dissolved in 1000 ml. of pyridine and added at 20° C. to a solution of 76 g. of chlorosulphonic acid (0.64 mol) in 1000 ml. of pyridine. The dyestuff ester precipitates immediately. The mixture is after-stirred for a few hours, in order to complete the reaction, and the solvent is decanted. The residue is suspended in 1000 ml. of water, adjusted to pH 7 with a dilute sodium hydroxide solution and the blue dyestuff is filtered off with suction. For removal of adhering pyridine, it is washed with methanol and dried under vacuum at 50° C.

The esterification of the dyestuff may also be carried out according to Example 18 with sulphuric acid-monohydrate.

EXAMPLE 21

0.1 mol of nickel-phthalocyanine-(3)-trisulphochloride are condensed according to the instruction of Example 20 with 60 g. of N-methyl-N-hydroxyethyl-propylenediamine-(1,3) (0.45 mol) in 600 ml. of water.

100 g. of this condensation product are dissolved in 300 ml. of sulphuric acid monohydrate and heated to 60° C. for an hour. The reaction mixture is allowed to cool and then poured onto ice. The crystalline dyestuff ester thus precipitates. After suction-filtering, the product is washed acid-free with water, the residue is suspended in water and adjusted to a pH 7 with sodium hydroxide solution. By renewed filtering off with suction and drying under vacuum at 40° C., 112 g. of a dyestuff are obtained which by alkaline fixation on cotton or regenerated cellulose yields a greenish blue dyeing of good fastness to washing.

EXAMPLE 22

0.2 mol of copper-phthalocyanine-(4)-tetrasulphochloride are introduced with ice-cooling into 142 g. of N,N-dihydroxyethyl-propylenediamine-(1,3) (0.88 mol) in 1400 ml. of water. The condensation product precipitates as a gelatinous mass. By the addition of potassium chloride and heating to 80–90° C., crystallisation suddenly sets in. The hot product is filtered off with suction and copper-phthalocyanine-(4)-$(SO_2NHC_3H_6N[C_2H_4OH]_2)_4$ is thus obtained in good yield which may be quantitatively converted into the corresponding dyestuff ester by one of the aforesaid methods with chlorosulphonic acid and pyridine or with sulphuric acid monohydrate.

EXAMPLE 23

162 g. of N,N-dihydroxyethyl-propylenediamine are dissolved in 1200 ml. of water and adjusted to pH 10 with dilute acetic acid. To the cold solution there are added 217 g. of copper-phthalocyanine-(3)-tetrasulphochloride while maintaining the pH value constant by means of dilute sodium hydroxide solution. After completion of the reaction, the dyestuff is salted out, filtered off with suction and dried under vacuum.

30 g. of copper-phthalocyanine-(3)-$(SO_2NHC_3H_6N[C_2H_4OH]_2)_4$ are esterified in 90 ml. of sulphuric acid monohydrate. The dyestuff is precipitated by means of ice-water, filtered off with suction and washed acid-free with a 5% potassium chloride solution. The filter cake is suspended in 1000 ml. of water and adjusted to pH 7 with 0.2 ml. of a 1 N sodium hydroxide solution. The dyestuff ester thus dissolves. After salting out with 185 g. of potassium chloride, the product is again filtered off with suction and dried under vacuum at 50° C.

2 g. of the dyestuff thus obtained are dissolved in 100 ml. of an aqueous solution containing per litre 40 g. of potassium carbonate or sodium carbonate, 100 g. of urea and 5 g. of Turkey-red oil and applied to hydroxyl group-containing materials in the manner described in Examples 13(f) and 15. The turquoise blue dyeings thus obtained show excellent fastness to washing, boiling, light and rubbing.

When using for the fixation on cotton or regenerated cellulose sodium bicarbonate or potassium bicarbonate instead of potassium carbonate, level dyeings which are fast to solvents are likewise obtained in quantitative yield.

In a similar manner, other acid-binding agents such as tertiary or secondary sodium or potassium phosphate or sodium acetate may be used for fixing the dyestuff described above.

EXAMPLE 24

(a) 0.029 mol of cobalt-phthalocyanine-(3)-disulphochloride are introduced into a solution of 13.5 g. of N,N-di-(hydroxyethyl)-propylenediamine-(1,3) in 60 ml. of water. After completion of the addition, the cooling is removed, and the pH value maintained at 9–9.5 with potassium carbonate. The mixture is then briefly heated to the boil and the product is separated from the colourless mother liquor.

(b) 52 g. of moist copper-phthalocyanine-(3)-trisulphochloride (corresponding to 12.5 g. of dry substance) are introduced into a cold solution of 18 g. of N-methyl-N-hydroxyethyl-propylenediamine-(1,3) in 100 ml. of methanol. The mixture is stirred overnight and then filtered off with suction.

(c) 0.1 mol of copper-phthalocyanine-(3)-tetrasulphochloride is introduced with ice-cooling into a solution of 106 g. of N - methyl - N-hydroxyethylpropylenediamine-(1,3) (0.8 mol) in 1000 ml. of water. Prior to the addition of the sulphochloride, the amine solution is buffered to pH 10 with a 10% sulphuric acid. After heating to room temperature, the pH value is maintained at 9.5–10 with 250 ml. of a 10% sodium hydroxide solution. The condensation is completed after 4 hours. The product is heated to 60° C., filtered off with suction while warm and washed with 2000 ml. of water.

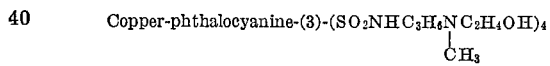

is thus obtained.

206 g. of moist

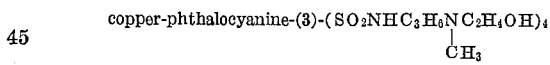

(corresponding to 78 g. of dry substance) are introduced at 10–20° C. within an hour into 240 ml. of sulphuric acid monohydrate. 877 g. of 65% oleum are then added dropwise at the same temperature within 90 minutes. The esterification is terminated after a further 30 minutes. The product is poured onto ice and the dyestuff is isolated in usual manner. The quantitative yield results from the observation that all filtrates and washing waters are colourless.

The products obtainable according to (a) and (b) can be esterified in the same manner.

EXAMPLE 25

0.1 mol of moist copper-phthalocyanine-(3)-tetrasulphochloride are introduced with ice-cooling into 80 g. of N-methyl-N-hydroxyethyl-propylenediamine-(1,3) and 1000 ml. of ethylene chloride. The mixture is stirred at room temperature for 5 hours and the water is then distilled off azeotropically. The condensation product is insoluble in the solvent. After cooling, 400 ml. of sulphuric acid monohydrate are added dropwise and allowed to act for a few hours. The sulphuric acid solution of the dyestuff is then decanted from the ethylene chloride and poured onto ice. The dyestuff ester is worked up in usual manner.

The process can also be carried out so that, after condensation and azeotropic distillation, the solvent is first decanted and esterification effected thereafter If in this example there is used instead of ethylene chloride, chloroform, benzene or toluene as a solvent, the same good results are obtained.

According to the instructions of Examples 20–25 the starting components listed in the following table may likewise be reacted and the dyestuffs thus obtained finally esterified; by the aforesaid methods or after slight modifications of fixing conditions such as temperature, type of acid-binding agent or time of stay at elevated temperatures, the dyestuff esters yield on cotton or regenerated cellulose dyeings and prints which are distinguished by especially good fastness properties, particularly a very good fastness to wetting.

tion of 0.1 mol of the azo dyestuff from diazotized 2-aminonaphthalene-4,8-disulphonic acid and m-toluidine in 500 ml. of water. The pH value is maintained at 5.5–6 by means of a dilute sodium hydroxide solution, until no further amine can be detected, the mixture is then adjusted to pH 6.5 and 65 g. of N,N-dihydroxyethyl-propylenediamine-(1,3) are added. After initial stirring at 20° C., the mixture is heated to 40° C. for 3 hours and then to 95° C. for 8 hours for the exchange of the two residual chlorine atoms of the cyanuric chloride. The mixture is allowed to cool and the dyestuff precipitated with acetone.

The hydroxyl-group-containing dyestuff can be esteri-

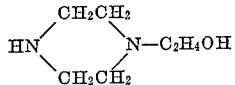

| Starting component | Amino alcohol | Shade of sulphuric acid semiester on cotton |
|---|---|---|
| Copper-phthalocyanine-(4)-tetrasulphochloride | N-methyl-N-hydroxyethyl-propylenediamine-(1,3) | Reddish blue. |
| Nickel-phthalocyanine-(3)-tetrasulphochloride | do | Turquoise. |
| Cobalt-phthalocyanine-(3)-trisulphochloride | do | Dull blue. |
| Cobalt-phthalocyanine-(3)-tetrasulphochloride | do | Do. |
| Sulphochlorinated tetraphenyl-copper-phthalocyanine (containing about 4 sulfochloride groups). | do | Green. |
| Sulphochlorinated azodyestuff o-Anisidine→2,3-hydroxynaphthoic acid o-anisidide. | do | Red. |
| Copper-phthalocyanine-(3)-trisulphochloride | N,N-dihydroxyethylpropylenediamine-(1,3) | Turquoise blue. |
| Nickel-phthalocyanine-(3)-trisulphochloride | do | Turquoise. |
| Nickel-phthalocyanine-(3)-tetrasulphochloride | do | Do. |
| Cobalt-phthalocyanine-(3)-trisulphochloride | do | Dull blue. |
| Cobalt-phthalocyanine-(3)-tetrasulphochloride | do | Do. |
| Sulphochlorinated tetraphenyl-copper-phthalocyanine (containing 4 to 8 sulfochloride groups). | do | Green. |
| Sulphochlorinatd azo-dyestuff o-anisidine→2,3-hydroxynaphthoic acid-o-anisidide. | do | Red. |
| Copper-phthalocyanine-(3)-tetrasulfochloride | HN(CH$_2$CH$_2$)(CH$_2$CH$_2$)N—C$_2$H$_4$OH | Blue. |
| Copper-phthalocyanine-(3)-tetrasulfochloride | H$_2$N—CH$_2$—CH$_2$—S—CH$_2$—CH$_2$—OH | Do. |

EXAMPLE 26

50 g. of chloromethylated copper-phthalocyanine are heated in an excess of N,N-dihydroxyethyl-propylene-diamine-(1,3) to 95° C. for 8 hours, allowed to cool and poured into 1000 ml. of water. After the addition of potassium chloride, the product is filtered off with suction and the dyestuff copper-phthalocyanine-(CH$_2$NHC$_3$H$_6$N[C$_2$H$_4$OH]$_2$)$_n$ (on an average $n=1.75$) is washed with ethanol, in order to remove still adhering amine.

30 g. of the dyestuff thus obtained are esterified at 20–22° C. in 90 ml. of sulphuric acid monohydrate. After 4 hours, the product is placed on ice and worked up as usual.

0.2 g. of dyestuff are dissolved in 10 ml. of the solution described in Example 13(f) and padded on cotton. By drying the material at 60–80° C., a very strong print is obtained of very good fastness to wetting.

EXAMPLE 27

30 g. of 1-amino-4-bromanthraquinone-2-sulphonic acid are heated in an excess of N,N-dihydroxyethyl-propylenediamine-(1,3) in the presence of some cuprous chloride for a few hours to 60° C., then to 100° C. and, after the exchange of the halogen, poured into five times its amount of water. The product is salted out with potassium chloride, filtered off with suction and re-dissolved from salt-containing water. 31.5 g. of a blue dyestuff are thus obtained which, after esterification with chloro-sulphonic acid and pyridine or with sulphuric acid monohydrate, can be dyed on cotton or viscose according to the instructions given in the preceding examples.

EXAMPLE 28

19.2 g. of cyanuric chloride are dissolved in 200 ml. of acetone and poured onto 600 ml. of ice-water. To the suspension, cooled to 0–5° C., there is added a solufied according to the methods described in the preceding examples.

0.4 g. of dyestuff ester are dissolved in 10 ml. of a solution containing 40 g. of sodium bicarbonate and 100 g. of urea in 1000 ml. of water. By padding on the foulard and subsequent fixation at 100–140° C., clear yellow dyeings are obtained of very good fastness to washing and boiling with sodium carbonate.

EXAMPLE 29

A printing paste consisting of 20 g. of the dyestuff obtainable according to Example 20, 100 g. of urea, 150 ml. of water, 10 g. of sodium hydroxide solution (38° Bé.), 400 g. of alginate thickening (120:1000) and 320 ml. of water is applied in usual manner to cotton and viscose. The dry prints are steamed neutral at 100–104° C. for 7 minutes and washed on a full width washing machine. A very level print is thus obtained.

EXAMPLE 30

40 g. of moist

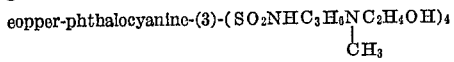

copper-phthalocyanine-(3)-(SO$_2$NHC$_3$H$_6$NC$_2$H$_4$OH)$_4$
                                    |
                                   CH$_3$ (corresponding to 20 g. of dry substance) are introduced at 10–20° C. into 100 ml. of sulphuric acid monohydrate and stirred for two hours. The sulphuric acid semiester of the dyestuff is then worked up in usual manner.

By printing cotton according to the method described in Example 29, dyeings of excellent fastness properties are obtained.

EXAMPLE 31

15.7 g. of the sulphuric acid semiester of 1-methyl-2-(N - methyl - N-β-hydroxyethyl-aminomethyl)-5-aminobenzimidazole are dissolved in 75 ml. of 2 N hydrochloric acid and diazotized in usual manner by the addition of a 10% sodium nitrite solution. The diazonium salt solution thus obtained is stirred into a solution of 12.7 g. of 1-(3'-sulphophenyl)-3-methyl-pyrazolone-(5)

in a 2 N sodium carbonate solution. After completion of the coupling, the dyestuff is isolated by acidification with hydrochloric acid and salting out.

2 g. of the dyestuff thus obtained are dissolved in 100 ml. of water with the addition of 3 g. of sodium carbonate and 10 g. of urea. The solution is padded on cotton and the impregnated fabric is heated to 140° C. for 10 minutes. The material is then rinsed and boiled with soap. A yellow dyeing of very good fastness to wetting is thus obtained.

EXAMPLE 32

Into a solution of 50 g. of the sulphuric acid semiester of 3-aminobenzyl-β-hydroxyethyl-methylamine in 300 ml. of water there are introduced at 30° C. 43 g. of copper - phthalocyanine - (3) - tetrasulphochloride while maintaining a pH value of 10 by the dropwise addition of sodium hydroxide solution. When no further consumption of alkali can be detected, the mixture is adjusted to pH 7.5 with hydrochloric acid and the dyestuff is salted out, filtered off with suction and dried.

2 g. of this dyestuff are dissolved in 100 ml. of water with the addition of 3.2 g. of sodium hydroxide, 0.5 g. of Turkey-red oil and 10 g. of urea. The solution is padded on cotton and the impregnated fabric is heated to 140° C. for 10 minutes. The fabric is then rinsed and boiled with soap. A blue dyeing is thus obtained which is very fast to wetting and has a good fastness to light.

EXAMPLE 33

A cotton fabric is impregnated with a 1% sodium hydroxide solution, well squeezed off and dried at 100° C. Onto the fabric thus treated there is then padded a solution of 3 g. of dyestuff [reaction product from 1 mol of copper-phthalocyanine-(3)-trisulphochloride with 3 mols of N,N-dihydroxy-ethyl-propylenediamine-(1,3) and subsequent esterification with sulphuric acid] and 6 g. of urea in 250 ml. of water and the fabric is heated to 140° C. for 10 minutes. The material is then rinsed and boiled with soap. A blue dyeing of very good fastness to wetting is thus obtained.

A blue dyeing which is very fast to wetting is also obtainable by padding the dyestuff solution mentioned in the above example on cotton previously impregnated with a 1% aqueous potassium-hydrogen-carbonate solution and dried at 100° C.

The fixation of the dyestuff can also be carried out by steaming.

EXAMPLE 34

41.8 g. (0.1 mol) of 1,4-di-p-toluido-anthraquinone are introduced with cooling into 100 ml. of chlorosulphonic acid and then heated to 80° C. for an hour whereupon the evolution of hydrochloric acid is essentially terminated. The reaction mixture is then cooled to 60° C. and a total of 35 ml. of thionyl chloride is added dropwise while slowly raising the temperature to 90° C. After stirring at this temperature for about ½ hour, the reaction mixture is cooled, placed on ice and the water-insoluble sulphochloride is washed acid-free on a suction filter.

The suction filter cake is introduced into a mixture of 265 g. of N-methyl-N-hydroxyethyl-propylenediamine-(1,3) and 500 ml. of water and stirred overnight. On the following morning the reaction mixture is after-stirred at 50° C. for about 2 hours, cooled, rendered neutral by the addition of half-concentrated hydrochloric acid, the intermediate product is isolated and dried.

The dry sulphonamide is introduced into 250 ml. of sulphuric acid monohydrate with external cooling, stirred at room temperature overnight and then placed into a mixture of a 20% potassium chloride solution and ice. The precipitated dyestuff-bis-sulphuric acid semiester is filtered off with suction, washed largely acid-free with dilute potassium chloride solution, then adjusted to pH 7 with the aid of a pH measuring apparatus, again isolated and dried at 40–50° C. in a vacuum drying oven.

The dyestuff thus obtained corresponds to the probable formula

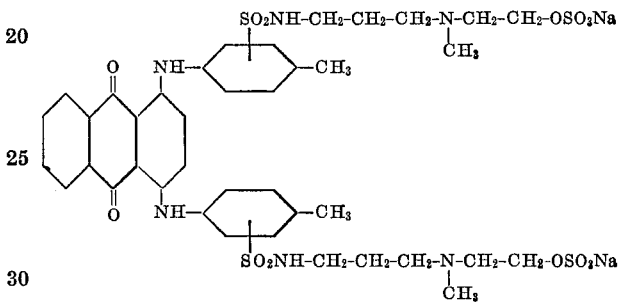

It can be fixed on fibre materials by the methods described above and yields a somewhat dull bluish green shade of good fastness to wetting.

In a similar manner there are obtainable from the starting components listed in the following table by sulphochlorination, condensation and esterification, dyestuff esters which, after fixing on cotton and regenerated cellulose according to the processes mentioned above, yield dyeings and prints in the shades indicated below which are fast to wetting.

| Anthraquinone component | Amine component | Shade of sulphuric acid semiester on cotton |
|---|---|---|
| 1,4-di-p-toluido-anthraquinone | N,N-di(hydroxyethyl)-propylenediamine-(1,3) | Dull bluish green. |
| 1,4-di-(2',6'-dimethylanilido)-anthraquinone | N-methyl-N-hydroxyethyl-propylenediamine-(1,3) | Clear reddish blue. |
| Do | N,N-di(hydroxyethyl)propylenediamine-(1,3) | Do. |
| 1,4-di-(2'-methyl-6'-ethylanilido)-anthraquinone | N-methyl-N-hydroxyethyl-propylenediamine-(1,3) | Do. |
| Do | N,N-di(hydroxyethyl)propylenediamine-(1,3) | Do. |
| 1,4-di-(2',6'-diethylanilido)-anthraquinone | do | Do. |
| Do | N-methyl-N-hydroxyethyl-propylenediamine-(1,3) | Do. |
| 1,4-di-(2',4',6'-trimethyl-anilido)-anthraquinone | do | Clear blue. |
| Do | N,N-di(hydroxyethyl)propylenediamine-(1,3) | Do. |
| 4-p-toluido-N-methyl-anthrapyridone | N-methyl-N-hydroxyethyl-propylenediamine-(1,3) | Bluish red. |
| Do | N,N-di(hydroxyethyl)propylenediamine-(1,3) | Do. |
| 4-anilido-N-methyl-anthrapyridone | do | Yellowish red. |
| Do | N-methyl-N-hydroxyethyl-propylenediamine-(1,3) | Do. |
| 4-(3'-chloroanilido)-N-methyl-anthrapyridone | do | Strongly yellowish red. |
| Do | N,N-di(hydroxyethyl)propylenediamine-(1,3) | Do. |
| 4-(4'-benzylanilido)-N-methyl-anthrapyridone | do | Bluish red. |
| Do | N-methyl-N-hydroxyethyl-propylenediamine-(1,3) | Do. |

EXAMPLE 35

23.9 g. of the dyestuff obtainable by coupling diazotized 3-aminobenzyl-β-hydroxyethyl ether with 1-phenyl-3-methyl-pyrazolone-(5) are dissolved in 150 ml. of pyridine. Into this solution there are added at 0° C. within 30 minutes 23.7 g. of chlorosulphonic acid, the reaction mixture is after-stirred at 0° C. for 2 hours and then introduced into a solution of 28.8 g. of sodium carbonate in 250 ml. of ice-water. The dyestuff is salted out, filtered off with suction and dried.

0.1 g. of the dyestuff thus obtained and 1 g. of urea are dissolved in 10 ml. of an 8% sodium hydroxide solution. The solution is padded on cotton and the impregnated fabric is heated to 160° C. for 30 minutes. The fabric is then rinsed and boiled with soap. A yellow dyeing of very good fastness to wetting is thus obtained.

EXAMPLE 36

0.05 mol of the monoazo dyestuff obtainable by diazotization of 2-aminonaphthalene-4,8-disulphonic acid and coupling with m-toluidine, further diazotization and coupling with 2-aminonaphthalene-1-sulphonic acid and subsequent oxidation of the o-aminoazo grouping to the triazine ring, is converted into the disulphochloride. The sulphochloride is washed acid-free, well suspended in 50 ml. of ice-water and introduced with ice-cooling into a solution of 26.4 g. (0.2 mol) of N-methyl-N-hydroxyethyl-propylenediamine-(1,3) in 100 ml. of water. After stirring at 0° C. for 2–3 hours, the mixture is slowly heated to 50° C. and the readily filterable dyestuff filtered off with suction after cooling.

After drying, the dyestuff thus obtained is introduced with cooling into an excess of sulphuric acid monohydrate so that it is well dissolved, and stirred at 20° C. for 3 hours. The solution is then poured onto the requisite amount of ice and the esterified dyestuff is precipitated by the addition of salt. For removal of the excess acid which can be washed out only with difficulty, it is expedient to resuspend the dyestuff in a little water and to render it neutral with sodium carbonate prior to another isolation. The dyestuff thus obtained presumably corresponds to the formula

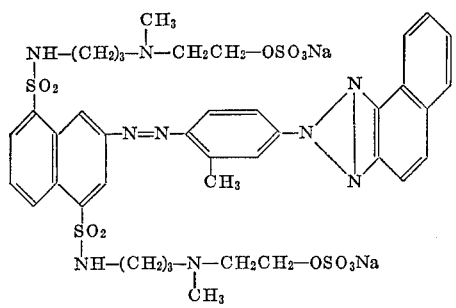

EXAMPLE 37

0.05 mol of the monoazo dyestuff disulphochloride described in Example 36 is thoroughly suspened in 50 ml. of ice-water and introduced with ice-cooling into a solution of 32.4 g. (0.2 mol) of N,N-dihydroxyethyl-propylene-diamine-(1,3) in 100 ml. of water. The reaction mixture is stirred at 0° C. for 3 hours, slowly heated, kept at 50° C. for an hour and, after cooling, filtered and dried. For esterification of the hydroxyethyl groups, the dyestuff thus obtained is introduced with cooling into an excess of sulphuric acid monohydrate, stirred at 20° C. for 3 hours, and the sulphuric acid semiester is isolated acid-free as indicated in Example 36. The dyestuff presumably corresponding to the formula

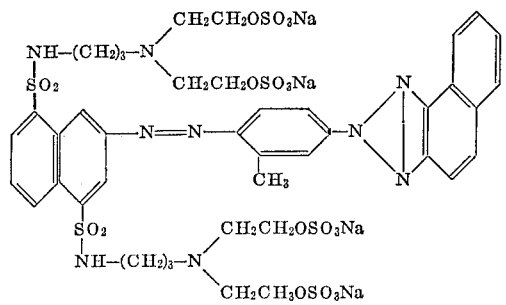

is very readily water-soluble. Isolation requires an addition of potassium chloride, until saturation is reached.

2 g. of the dyestuff obtainable according to this example and Example 36 are dissolved in 100 ml. of a solution of 10 g. of urea, 4 g. of sodium carbonate and 0.2 g. of Turkey red oil; fabrics of native or regenerated cellulose are treated with this dyestuff solution according to the padding process with or without prior drying at 120° C. for 10–15 minutes. Clear yellow dyeings of excellent fastness to washing and chlorine and good fastness to light are thus obtained.

If in this example in an equivalent amount of 1-amino-4-N-β-hydroxyethyl-N-methyl-cyclohexan is used instead of 32.4 g. of N,N-dihydroxyethyl-propylenediamine-(1,3) a dyestuff is obtained which can be fixed on native or regenerated cellulose according to the above instruction and yielding blue shades of good fastness properties.

In a similar manner to that described in Examples 36 and 37, the following triazole-monoazo compounds are converted via their sulphochlorides into the corresponding reactive sulphuric acid semiesters which, when dyed or printed on cotton by the methods described in the preceding examples, yield yellow to reddish yellow shades of excellent fastness to washing and chlorine and good fastness to light.

2-aminonaphthalene-4,8-disulphonic acid→1-amino-2-methoxy-5-methylbenzene→2-aminonaphthalene-1-sulphonic acid, triazolated.

2-aminonaphthalene-4,8-disulphonic acid→1-aminonaphthalene→2-aminonaphthalene-6-sulphonic acid, triazolated.

2-aminonaphthalene-6,8-disulphonic acid→1-amino-3-methylbenzene→2-aminonaphthalene-1-sulphonic acid, triazolated.

2-aminonaphthalene-6,8-disulphonic acid→1-amino-2-methoxy-5-methylbenzene→2-aminonaphthalene-1-sulphonic acid, triazolated.

2-aminonaphthalene-4,8-disulphonic acid→1-amino-3-methylbenzene; condensed with cyanuric chloride, and residual chlorine atoms hydrolysed.

2-aminonaphthalene-4,8-disulphonic acid→2-aminonaphthalene-5-sulphonic acid, triazolated, the nitro groups reduced,→1-amino-3-methylbenzene→2-aminonaphthalene-6-sulphonic acid, triazolated to give the bis-triazole of the formula

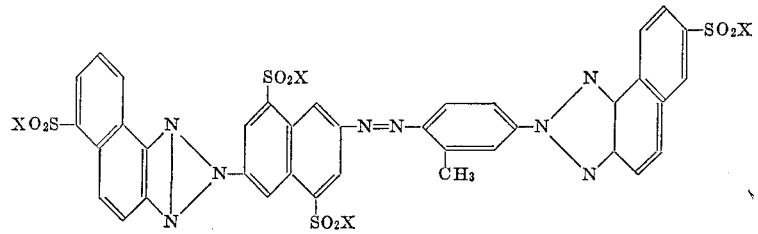

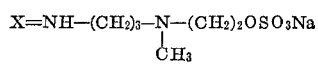

or

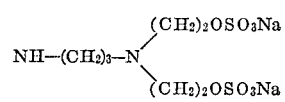

Similar yellow dyestuffs are obtainable by replacing the 2-aminonaphthalene-5-sulphonic acid of the last example by 2-aminonaphthalene-6-sulphonic acid or by replacing 2-aminonaphthalene-6-sulphonic acid by 2-aminonaphthalene-5-sulphonic acid.

Instead of m-toluidine there may be used with similar results aniline, xylidine, cresidine or β-naphthylamine.

EXAMPLE 38

A cotton fabric is impregnated with an aqueous solution containing 3% of potassium carbonate and 1% of an alginate thickening, squeezed off and dried. The fabric thus treated is then printed with a printing paste of 2 g. of the dyestuff described in Example 33
10 g. of urea
25 ml. of water
60 g. of alginate thickening.

The printed fabric is dried at 80° C. and then heated to 140° C. for 10 minutes. It is then rinsed and boiled with soap. A blue print is thus obtained which is very fast to wetting.

The fixation of the dyestuff may also be effected by steaming. As acid-binding agents with which the cotton fabric is pre-treated, there are also suitable for example sodium hydroxide, sodium carbonate, sodium-hydrogencarbonate, trisodium phosphate.

EXAMPLE 39

Cyanauric chloride is condensed first at a low temperature with the equimolar amount of 2,4-diaminobenzenesulphonic acid, then at elevated temperatures with twice its molar amount of 1-amino-3-(di-$\beta$-dihydroxyethylamino)-propane. By diazotizing this condensation product and coupling it with 1-hydroxy-8-benzoylaminonaphthalene-3,6-disulphonic acid and, finally, converting the coupling product into the sulphuric acid semiester by means of chlorosulphonic acid and pyridine, a dyestuff is obtainable which according to the method described in Example 31 dyes cotton in bluish red shades which are very fast to washing and solvents.

EXAMPLE 40

The sulphochloride obtainable by the action of chlorosulphonic acid on the condensation product from tetrachloro-p-benzoquinone and 3-amino-N-ethylcarbazole is converted with 1-amino-3-(methyl-$\beta$-hydroxyethyl)amino-propane into the corresponding sulphonamide. 30 g. of the dyestuff esterified with sulphuric acid are dissolved in 1000 ml. of a solution containing 15 g. of sodium hydroxide, 1 g. of Turkey-red oil and 100 g. of urea. Cotton fabric impregnated with this solution is heated to 110° C. for 10 minutes. After rinsing and boiling with soap, a bluish violet dyeing is obtained which is very fast to washing and solvents.

EXAMPLE 41

By the reaction of copper-phthalocyanine-(4)-tetrasulphochloride with four times its molar amount of 1-amino-2-hydroxy-3-diethylamino-propane a sulphonamide is obtained which is converted into the sulphuric acid semiester by the action of concentrated sulphuric acid with the addition of oleum. 20 g. of this dyestuff are dissolved in 1000 ml. of the solution described in Example 40, the solution is padded on cotton poplin and the impregnated fabric is treated at 120° C. for 10 minutes. After rinsing and boiling with soap, a greenish blue dyeing is obtained which is very fast to wetting.

EXAMPLE 42

Into a mixture of 148 g. (2 mol) of N-methyl-N-$\beta$-hydroxyethylamine and 5 ml. of water there is introduced at 100° C. 0.1 mol of the sulphuric acid semiester of copper - phthalocyanine - (3) - tetrasulpho - $\beta$ - hydroxyethylamide and the mixture is heated on an oil bath at 140° C. for 3½ hours. After cooling, the mixture is treated with 250 ml. of water and the content of the flask is added to 500 ml. of a 20% potassium chloride solution. The reaction mixture is neutralised by the addition of half-concentrated hydrochloric acid then filtered off and washed on the filter with about 10 litres of water at 60° C. The dry product is introduced with external cooling into 440 ml. of sulphuric acid monohydrate and stirred at room temperature for 4 hours. The content of the flask is poured onto a mixture of ice and a 20% potassium chloride solution, filtered off with suction, washed with potassium chloride solution, the dyestuff is suspended in water, rendered neutral by the careful addition of sodium hydroxide, completely salted out by the addition of potassium chloride, filtered off with suction and dried at 40–50° C. in a vacuum drying oven.

The dyestuff thus obtained can be fixed on fibre materials according to the methods described in the preceding examples and yields a clear blue shade of good fastness to wetting.

EXAMPLE 43

Into a mixture of 168 g. (1.6 mol) of N,N-di-$\beta$-hydroxyethylamine and 5 ml. of water there is added at 100° C. 0.1 mol of the sulphuric acid semiester of copper-phthalocyanine-(3)-tetrasulpho-$\beta$-hydroxyethylamide, the mixture is heated at 160° C. for 3½ hours and the process is otherwise carried out as described in Example 42.

The dyestuff thus obtained can be fixed on fibre materials as described above and yields a clear blue shade of good fastness to wetting.

EXAMPLE 44

Into an autoclave there is placed a mixture of 74 g. (1 mol) of N-methyl-N-$\beta$-hydroxyethylamine, 200 ml. of water and 0.05 mol of the sulphuric acid semiester of copper-phthalocyanine - (3) - trisulpho-$\beta$-hydroxyethylamide, and the reaction mixture is heated to 150° C. for 8 hours. Working up of the experiment is carried out as described in Example 42.

The dyestuff thus obtained fixed on cotton and regenerated cellulose yields a clear blue shade of good fastness to wetting.

EXAMPLE 45

Into an autoclave there is placed a mixture of 105 g. (1 mol) of N,N-di-$\beta$-hydroxyethylamine, 200 ml. of water and 0.05 mol of the sulphuric acid semiester of copper-phthalocyanine (3) - tri-sulpho - $\beta$ - hydroxyethylamide and the reaction mixture is heated to 150° C. for 8 hours. Working up of the experiment is carried out in the manner described in Example 42.

The dyestuff fixed on fibre materials yields a clear blue shade of good fastness to wetting.

EXAMPLE 46

116 g. of the sulphuric acid semiester of 1-amino-4-(3' - $\beta$ - hydroxyethyl - sulphonamido - phenyl) - aminoanthraquinone-2- sulphonic acid are introduced into a mixture of 405 g. of N,N-di-$\beta$-hydroxyethylamine and 405 ml. of water and heated to 105° C. The progress of the reaction is controlled by chromatography. After completion of the reaction (10–15 hours), the reaction mixture is added to a 20% potassium chloride solution, filtered off with suction and washed with potassium chloride solution.

The dry dyestuff is introduced into 400 ml. of sulphuric acid monohydrate and stirred overnight. On the following morning, the reaction mixture is placed on a mixture of a 20% potassium chloride solution and ice, filtered off with suction, the suction filter cake is washed with methanol, the dyestuff suspended in water, rendered carefully neutral by the addition of a sodium hydroxide solution, the product is salted out by the addition of potassium chloride and dried.

The dyestuff thus obtained can be fixed on fibre materials by the methods described in the preceding examples and yields a clear somewhat reddish blue shade of very good fastness to wetting.

EXAMPLE 47

50 g. of the dyestuff presumably having the formula

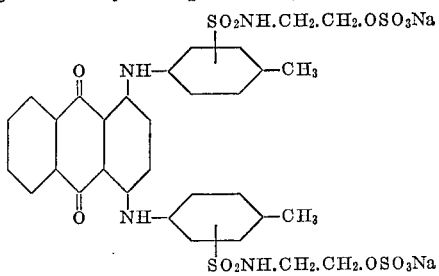

are introduced into a mixture of 250 g. of N,N-di-β-hydroxyethylamine and 250 ml. of water and heated to 110° C. The progress of the reaction is controlled by chromatography; the reaction period is about 15–20 hours. Working up of the experiment is carried out according to Example 42. The dyestuff, fixed on hydroxyl-group-containing materials, yields a somewhat dull bluish green of good fastness to wetting.

EXAMPLE 48

50 g. of the dyestuff presumably having the formula

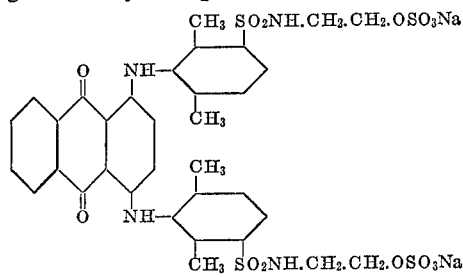

are introduced into a mixture of 250 g. of N,N-di-β-hydroxyethylamine and 250 ml. of water and heated to 110° C. The progress of the reaction is controlled by chromatography; the reaction period is about 15–20 hours. Working up of the experiment and fixation of the dyestuff on fibre materials are carried out according to Example 42. A clear reddish blue shade of good fastness to wetting is thus obtained.

EXAMPLE 49

1 mol of diazotized 4-aminobenzyl-β-hydroxyethylthio-ether is coupled in usual manner with 1 mol of 2-hydroxynaphthalene-5,7-disulfonic acid. The β-hydroxyethyl group in the azo dyestuff thus obtained is converted into the β-chloroethyl group by treating the dyestuff with thionylchloride. 5 g. of this dyestuff are dissolved in 100 ml. of water with the addition of 40 ml. of soda lye (38° Bé.). The dyestuff solution is padded onto a nettle fabric (unbleached cotton cloth) and the material thus treated is heated to 140° C. for 10 minutes. Finally, the dyed fabric is rinsed with water and soaped at the boil. An orange red dyeing being very fast to wet processing is thus obtained. A dyeing of the same quality is obtainable if soda is used as acid-binding agent.

EXAMPLE 50

145 g. of copper-phthalocyanine-(3)-tetrasulfochloride are introduced with ice cooling into a mixture of 150 g. of ethanolamine and 290 ml. of water, and stirred overnight at room temperature. After heating for 2 hours to 50–55° C. the condensation product is filtered with suction. It is washed with 2 l. of hot water and then dried at 50° C. in vacuo.

The dry substance is boiled with 500 ml. of thionylchloride for 5 hours with reflux condensing and, after cooling to room temperature, poured onto ice. The well filterable substance thus obtained is filtered with suction and washed neutral with water.

The thoroughly pressed filter cake is brought into 1200 g. of N-methyl-5-oxypentylamine-(1) and stirred for 5 hours at 110–120° C. The cooled solution is then poured with stirring into 3 l. of water, salted out with the addition of saturated potassium chloride solution and filtered with suction. The filter cake is washed with 3 l. of water and then dried at 50° C. in vacuo. The product is converted into the sulfuric acid ester by dissolving the dried mass with cooling in 600 ml. of sulfuric acid (100 percent) and keeping the solution at room temperature for 3 hours. The ester is then poured onto ice, diluted to a volume of 10 l. with water and the dyestuff therefrom precipitated by the addition of potassium chloride. After filtering with suction the dyestuff is pasted with water and rendered neutral (pH 7) by adding 10 percent soda lye. The dyestuff is again filtered with suction and dried at 50° C. in vacuo.

2 g. of the dyestuff thus produced are dissolved in 100 ml. of water with the addition of 3.2 g. of sodium hydroxide, 0.3 g. of Turkey-red oil and 10 g. of urea. This solution is padded onto a cotton fabric which is then heated to 110° C. for 10 minutes. The dyed fabric is then rinsed with water and boiling soaped. One obtains a blue dyeing which is very fast to wet processing.

EXAMPLE 51

The sulfonic acid groups in the dyestuff of the following formula

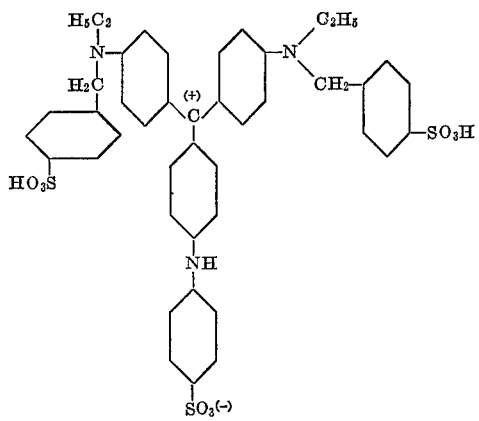

are converted into sulfochloride groups by treating the dyestuff with chlorosulfonic acid and thionyl chloride. The product thus obtained is converted into the sulfonamide by reacting with N-β-hydroxyethyl-N-methyl-propylenediamine-(1,3). After esterification with sulfuric acid, 30 g. of the dyestuff are dissolved with 1000 ml. of a solution which contains 50 g. of urea, 1 ml. of Turkey-red oil and 10 g. of a 30 percent soda lye. A nettle fabric is impregnated with this solution, heated to 120° C. for 10 minutes, rinsed and soaped. A blue dyeing is thus obtainable which is fast to washing and to solvents.

We claim:

1. A dyestuff of the formula:

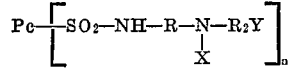

wherein:
Pc is a copper, nickel or cobalt phthalocyanine dyestuff moiety having the

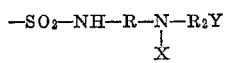

groups directly bonded to nuclear carbon atoms thereof, said

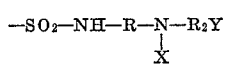

groups being bonded to the 3 or 4 position of each benzoid ring in Pc, each benzoid ring having no more than one

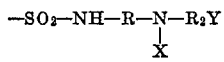

group, said Pc being otherwise unsubstituted;
$n$ is a number from 1 to 4;
R is lower alkylene having 2 to 4 carbon atoms;
X is hydrogen, methyl or $R_2$—Y;
$R_2$ is lower alkylene having from 2 to 4 carbon atoms and
Y is —$OSO_3H$ or —$OSO_3Z$, wherein Z is an alkali metal cation.

2. A dyestuff of claim 1 wherein the dyestuff is copper phthalocyanine.

3. A dyestuff of claim 1 wherein the dyestuff is nickel phthalocyanine.

4. A dyestuff of claim 1 wherein the dyestuff is copper phthalocyanine, X is methyl and Y is —$OSO_3H$.

5. A dyestuff of claim 1 wherein the dyestuff is copper phthalocyanine, R is —$CH_2$—$CH_2$—$CH_2$—, $R_2$ is —$CH_2CH_2$—, Y is —$OSO_3H$ and X is methyl or

—$CH_2$—$CH_2$—$OSO_3H$.

References Cited
UNITED STATES PATENTS

| | | | |
|---|---|---|---|
| 2,311,065 | 2/1943 | McNally et al. | 260—373 |
| 2,670,265 | 2/1954 | Heyna et al. | 260—314.5 |
| 2,863,875 | 12/1959 | Bienert et al. | 260—314.5 |
| 3,066,005 | 11/1962 | Wedemeyer et al. | 260—314.5 |
| 2,761,868 | 9/1956 | Lacey | 260—314.5 |
| 2,722,284 | 11/1956 | Barnhart et al. | 260—314.5 |
| 2,072,062 | 2/1937 | Wolfram et al. | 8—54.2 |
| 2,350,188 | 5/1944 | Pinkney | 8—54.2 |

FOREIGN PATENTS 181,750   6/1922   Great Britain.

OTHER REFERENCES

Venkataraman: Synthetic Dyes, Academic Press, Inc., New York (1952), pages 467, 646, 647, 812 and 1291.

Colour Index, 2nd ed., 1956, Soc. of Dyers and Colourists, vol. 2, p. 2201, Entry CI 74180; Ibid., vol. 3, p. 3570, Entry 74180.

HENRY R. JILES, Primary Examiner

H. I. MOATZ, Assistant Examiner

U.S. Cl. X.R.

8—39, 42, 44, 54.2; 260—153, 163, 147, 200, 185, 199, 198, 371, 162, 268, 157, 392, 374, 316, 297, 287